M. LACHMAN.
WELDED METAL WORK.
APPLICATION FILED DEC. 14, 1911.
1,184,079.
Patented Mar. 30, 1915.
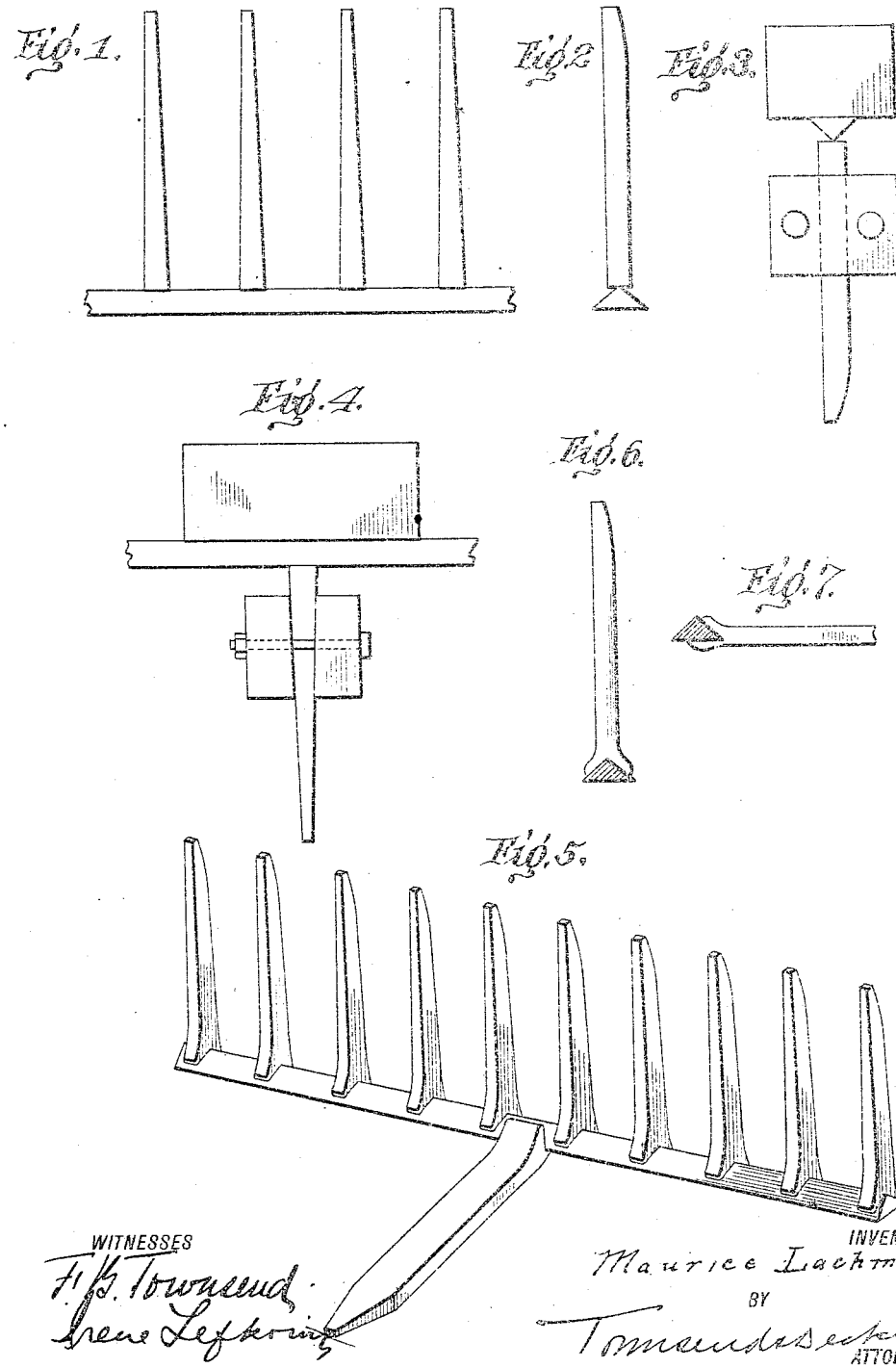

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

WELDED METAL-WORK.

1,134,079.  Specification of Letters Patent.  Patented Mar. 30, 1915.

Original application filed September 25, 1909, Serial No. 519,987. Divided and this application filed December 14, 1911. Serial No. 665,711.

*To all whom it may concern:*

Be it known that I, MAURICE LACHMAN, a citizen of the United States, and a resident of New York, in the county of New York and State of New York, have invented certain new and useful Improvements in Welded Metal-Work, of which the following is a specification.

This invention relates to metal work in which the component parts are welded together in such manner that one of the parts becomes split to provide a bearing for it on the sides of the other part.

The object of the invention is to provide a strong, cheap article capable of withstanding more strain and hard usage than has previously been obtained in metal work welded together in the ordinary manner.

Another object is to so form the parts that they may be joined by employing the electric welding process in as economical a manner as possible whereby the cost of manufacture is greatly reduced and a superior article as to strength is attained.

The invention is particularly applicable to the manufacture of rakes especially when it is desired to keep down the cost and yet obtain a strong durable article and it is to this class of articles that the invention will be described as being applied.

The invention consists in the novel structure of welded metal work hereinafter more particularly described and then specified in the claims.

The accompanying drawings illustrate various steps in the manufacture of a rake or other article constructed in accordance with this invention, it being understood that the same are for the purpose of illustration only.

Figure 1 shows in side elevation pieces of metal to be united in accordance with this invention in one of its forms. Fig. 2 is an end view of the same. Fig. 3 illustrates diagrammatically the pieces to be welded and suitable contacts which might be employed to transmit the heating current and apply the welding pressure. Fig. 4 is a view looking at the apparatus shown in Fig. 3 and turned 90°. Fig. 5 is a perspective view of a finished rake made in accordance with this invention. Fig. 6 is a transverse section taken on the line X X Fig. 5 and looking in the direction of the arrow A. Fig. 7 is a similar section taken on the line Y Y Fig. 5 and looking in the direction of the arrow B.

The pieces of work 1, 2, to be welded are held between suitable electric contact and pressure blocks 3, 4, opposite each other, the said blocks forming part of an electric welding machine of any suitable form by which a heating current may be supplied to pass through the pieces 1, 2, said machine being of any suitable construction as well-known in the art so that pressure may also be applied to the work in a line connecting the contact 3, 4.

One of the pieces, such as 2, is provided with one or more surfaces inclined to the line of pressure between the contact blocks 3, 4, so that a wedge-shaped piece is presented, against the apex of which the end of the opposite piece 1 is butted, the apex being preferably a sharp edge, as shown, but not necessarily so.

The electric current is turned on, and the pressure applied preferably by moving one of the contact blocks 3, 4, toward the other whereby as the work softens at the point of contact of the two pieces, due to the heating current, the end of the piece 1 will be split by the wedging action of the piece 2 and be forced down on the inclined sides of the piece 2, the pieces being united together both at the apex of the wedge-shaped piece 2 and along the inclined sides to a greater or less degree, the spreading of the piece 1 on the sides of the piece 2 forming an increased bearing and surface of contact between the parts.

The part 2 will split the part 1 before being welded thereto as the said part 2 having a large radiating surface will heat more slowly than the end of the tine, the comparative heating of the two parts being preferably also controlled by providing the electrode 3 with a larger radiating surface than the electrode 4 or the comparative heating may be controlled by any other means well-known in the art.

Obviously, the inclined surfaces of the part 2 might extend the entire length and depth of the material or might only extend a part of the distance either way, the object being to provide a wedge-shaped section at the point of contact of the two pieces, one or more sides of the wedge being inclined to the line of upsetting pressure whereby the opposite piece will be split and engage the sides of the piece to which it is welded.

The drawings illustrate a convenient way to manufacture rakes in accordance with the invention in which the pieces 1 indicate the tines or prongs and 2 indicates the head to which the tines are fastened. In this case the contact 3 is merely a block of conducting material against which the head 2 is seated and the contact 4 is formed as a clamp to grip the inclined sides of the tine as shown.

The head 2 is shown as a strip of metal triangular in cross-section, but might obviously be of any other suitable form whereby an inclined surface would be presented to the end of the tine, inclined to the line of pressure transmitted to the work through the contacts 3, 4, to upset the same and effect the welding of the two pieces.

It will be observed that a rake constructed as shown and described will be capable of standing great strain owing to the increased bearing surface of the tines on the head and the large welded union between the two parts effected thereby.

5 indicates the prong to which the handle for the rake is secured and which is welded to the head 2 in a manner similar to welding the tines 1 as above described, but located at right angles to the prongs as is usual.

This application constitutes a division of my prior application filed September 28th, 1909, Serial Number 519,997, patented April 8th, 1913, No. 1,058,243.

What I claim as my invention is:

1. As a new article of manufacture, a rake comprising solid metal tines united to an edge of a solid metal head having inclined sides, the tines being split and having a bearing on the inclined sides of the head.

2. A rake consisting of a triangular-shaped solid metal head and solid metal tines welded to the head, the tines being split and having a bearing on the sides of the triangular head and a shank for the handle welded to the head.

Signed at Long Island City in the county of Queens and State of New York this 12th day of December, A. D. 1911.

MAURICE LACHMAN.

Witnesses:
 REGINALD HAWLEY,
 M. KELLEY.